Figure 7:
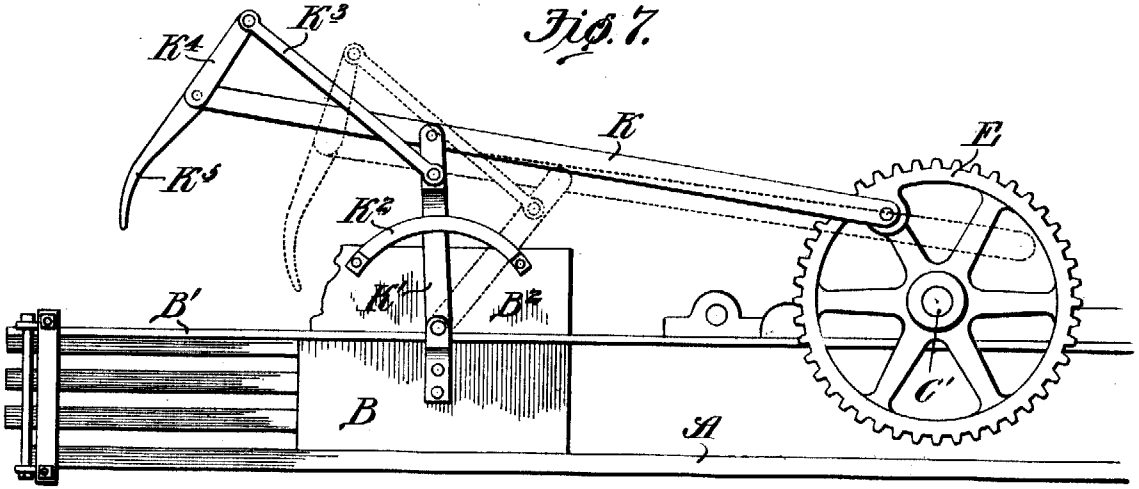

C. E. WEHRENBERG.
BALING PRESS.
APPLICATION FILED MAR. 20, 1908.
12,865.
Reissued Oct. 13, 1908.
4 SHEETS—SHEET 1.
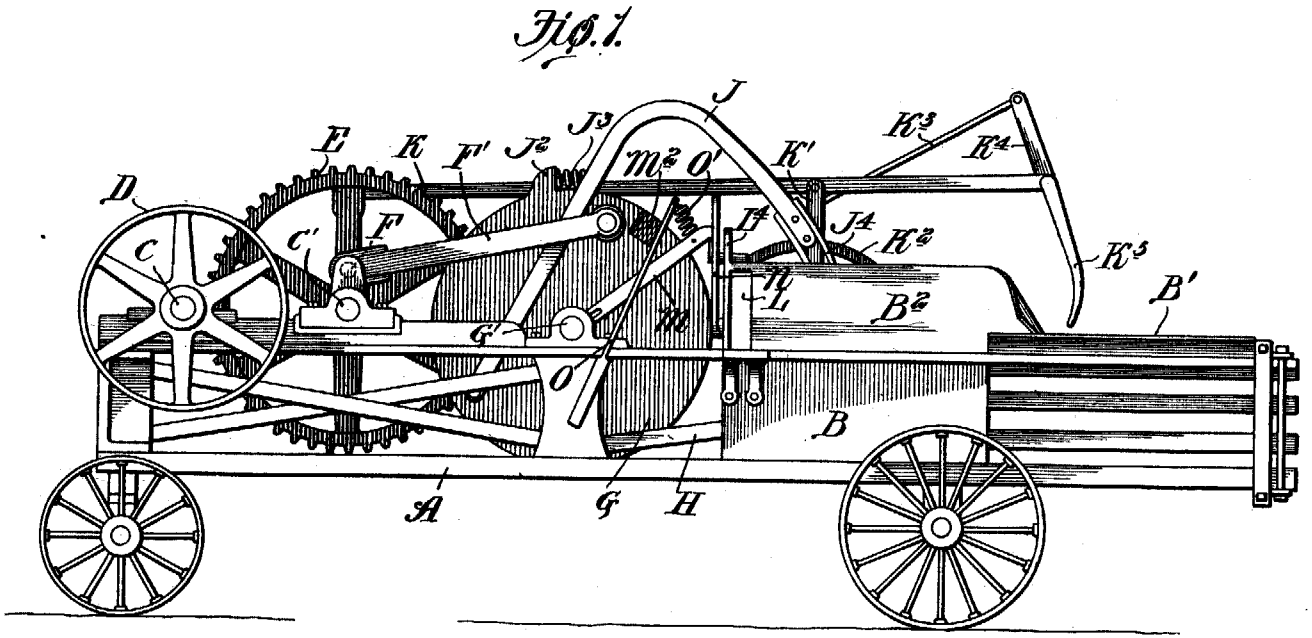
Witnesses:
A. J. McCauley
Nelle L. Church
Inventor,
C. E. Wehrenberg.
By Bakewell & Cornwall Attys.
THE NORRIS PETERS CO., WASHINGTON, D. C.

C. E. WEHRENBERG.
BALING PRESS.
APPLICATION FILED MAR. 20, 1908.
12,865.
Reissued Oct. 13, 1908.
4 SHEETS—SHEET 2.
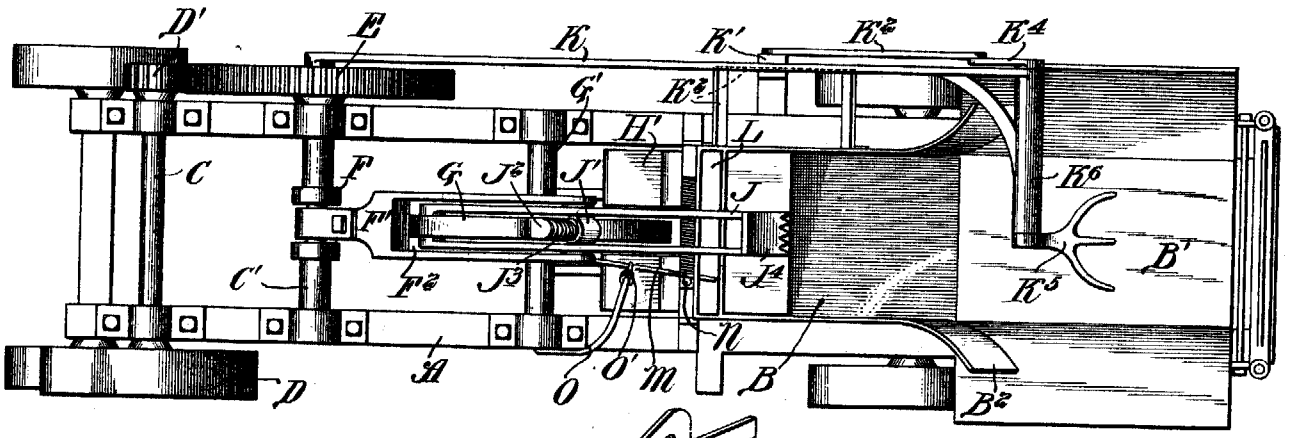
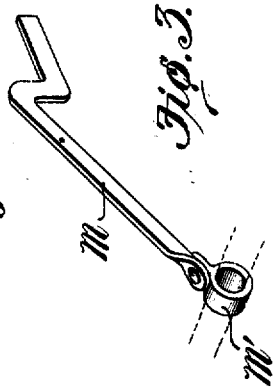
Witnesses:
George Larson
Nelle L. Church
Inventor,
C. E. Wehrenberg.
By Bakewell & Cornwall Attys.
THE NORRIS PETERS CO., WASHINGTON, D. C.

C. E. WEHRENBERG.
BALING PRESS.
APPLICATION FILED MAR. 20, 1908.
12,865. Reissued Oct. 13, 1908.
4 SHEETS—SHEET 3.
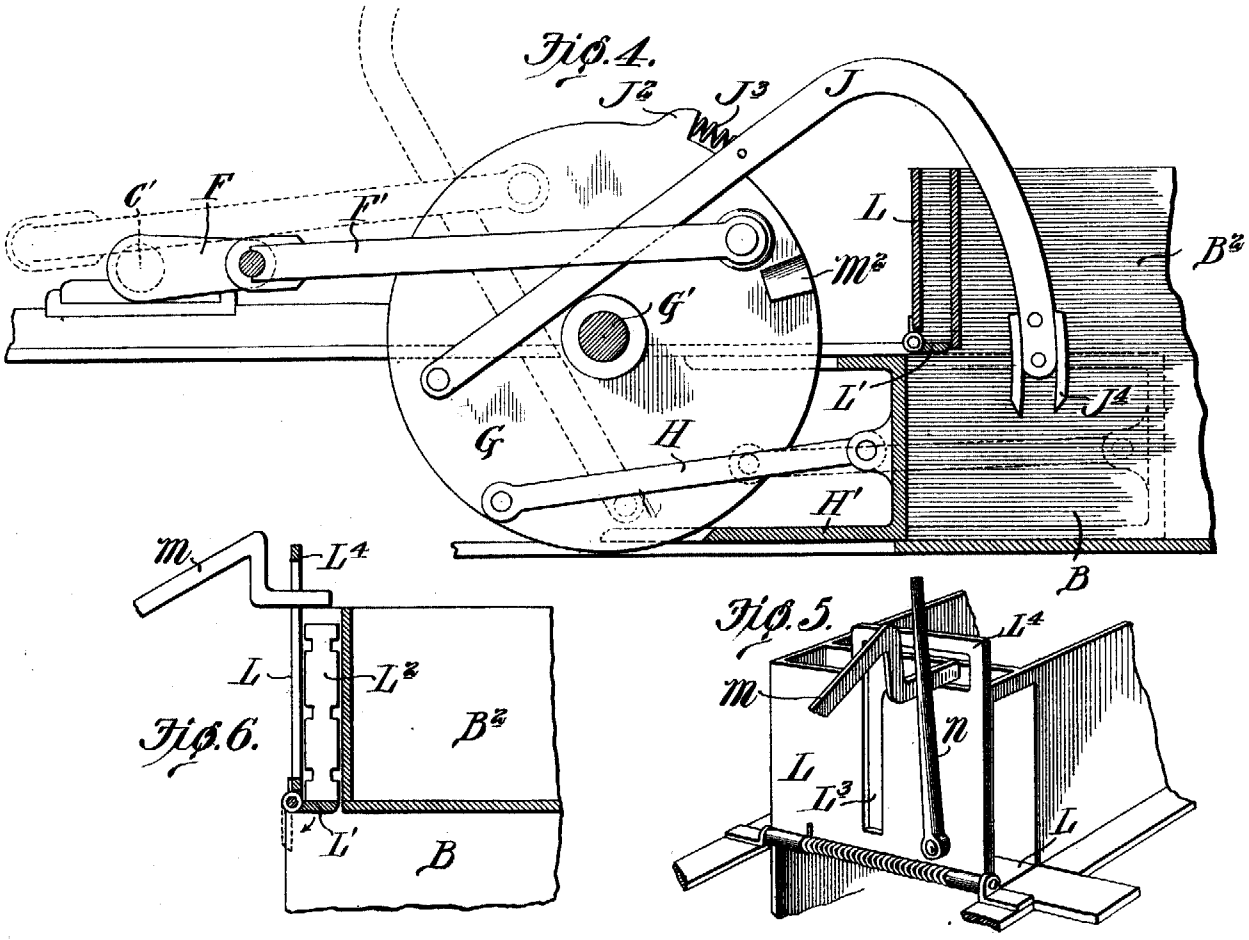
Witnesses:
George Lobson
Nelle L. Chunel
Inventor,
C. E. Wehrenberg.
By Rakewell & Cornwall Attys.
THE NORRIS PETERS CO., WASHINGTON, D. C.

C. E. WEHRENBERG.

BALING PRESS.

APPLICATION FILED MAR. 20, 1908.

12,865.

Reissued Oct. 13, 1908.

4 SHEETS—SHEET 4.

Witnesses:
George Cabson
Nelle L. Church

Inventor,
C. E. Wehrenberg.
By Bakewell & Cornwall Attys.

THE NORRIS PETERS CO., WASHINGTON, D. C.

UNITED STATES PATENT OFFICE.

CHARLES E. WEHRENBERG, OF MOUND CITY, ILLINOIS, ASSIGNOR TO BELLEVILLE BALER COMPANY, OF BELLEVILLE, ILLINOIS, A CORPORATION OF ILLINOIS.

BALING-PRESS.

No. 12,865. Specification of Reissued Letters Patent. Reissued Oct. 13, 1908.

Original No. 844,068, dated February 12, 1907, Serial No. 315,613. Application for reissue filed March 20, 1908. Serial No. 422,372.

*To all whom it may concern:*

Be it known that I, CHARLES E. WEHRENBERG, a citizen of the United States, residing at Mound City, county of Pulaski, State of Illinois, have invented a certain new and useful Improvement in Baling-Presses, of which the following is a full, clear, and exact description, such as will enable others skilled in the art to which it appertains to make and use the same.

This invention relates to baling presses.

One object of my invention is to provide a baling press having means for automatically feeding the material to be compressed into position to be forced down into the baling chamber.

Another object is to provide a baling press having a feeder arm which forces the material down into the baling chamber, a novel actuating means for said arm which is so constructed that the arm can yield in case it comes into contact with any hard or solid object that has become mixed with the material.

Another object is to provide a baling press having a divisional-block holder and improved means for automatically discharging the blocks from said holder. And still another object of my invention is to provide a baling press in which the pressure of the plunger or compressing member increases gradually as said plunger advances into the baling chamber, said plunger being moved out of the baling chamber with a quick and sudden stroke.

Figure 1 is a side elevation of a baling press constructed in accordance with my invention; Fig. 2 is a top plan view of said press; Fig. 3 is a detail perspective view of the block operating lever; Fig. 4 is an enlarged side elevation of the mechanism for operating the feeder arm and plunger or compressing member, a portion of said plunger and the baling chamber being shown in section; Fig. 5 is a detail perspective view showing the block holder and certain parts connected thereto; Fig. 6 is a vertical sectional view taken through the block holder, the end of a block being shown in elevation; and Fig. 7 is a diagrammatic side view of the mechanism which automatically feeds the material to the feeder arm.

Referring to the drawings which illustrate one form of my invention, A designates a truck provided with a baling chamber B, a platform B′ arranged adjacent the baling chamber, and a hopper $B^2$ located above the baling chamber. Shafts C, C′ and G′ are journaled in bearings upon the truck, and the shaft C is provided with a belt wheel D and a gear D′ which meshes with a gear wheel E on the shaft C′.

The means herein shown for operating the plunger or compressing member and the feeder arm consists of a disk G which is secured to the shaft G′, said disk being oscillated by means of a pitman F′ connected at one end to the disk and at its opposite end to a crank arm F on the shaft C′, said pitman being bifurcated at $F^2$, as shown in Fig. 2, so that it can straddle or embrace the disk G.

The compressing member consists of a plunger H′ that reciprocates in the baling chamber B, said plunger being connected to the disk G by means of a plunger rod H which has its inner end pivotally connected to the disk at a point opposite to the pivotal connection of the pitman F′ with the disk. A feeder arm J is provided for forcing the material from the hopper B′ down into the baling chamber B, and said feeder arm is provided with a bifurcated portion which straddles the disk G and is pivotally connected thereto. A block J′ is connected to the bifurcated portion of the feeder arm J adjacent the periphery of the disk G, and on the periphery of said disk is a lug $J^2$. A spring $J^3$ is arranged between said lug and block so as to permit the feeder arm to yield in case it comes into contact with some hard or solid object when it is forcing the material down into the baling chamber, the front end of the feeder arm being provided with jaws $J^4$ of any preferred construction.

The material to be baled is thrown or deposited on the platform B′ and is then fed automatically from said platform to the hopper $B^2$ by means of the following mechanism: A pitman K, which is pivotally connected to the upper end of a rock arm K′, is provided at one end with a sleeve $K^6$ in which a shaft is journaled, the opposite end of said pitman being connected to the large gear E, as shown in Fig. 7. The shaft that is journaled in the sleeve $K^6$ is provided at one end with a rake or pronged member $K^5$, and on the opposite end of said shaft is a crank arm $K^4$ which is connected to the rock arm K′ by means of a link $K^3$, one side of the hopper $B^2$ being provided with a guide bracket $K^2$ in which the rock arm K′ travels. As the gear E revolves the rake or pronged member $K^5$ will be moved from the position shown in full lines in Fig. 7 into the position shown in broken lines in said figure, and thus feed the material on the platform B′ into the hopper $B^2$ where it can be acted on by the feeder arm J which forces it down into the baling chamber, the rake or feeding member $K^5$ being moved from the platform to the hopper at each cycle of operations of the machine.

A block holder L is arranged at the inner end of the hopper $B^2$, and said block holder is provided with a spring hinged bottom L′ upon which the divisional-blocks $L^2$ rest, as shown in Fig. 6, the outside wall of said block holder being provided with a vertically disposed slot $L^3$. A block operating lever M rests in a guideway $L^4$ on the upper edge of the block holder, and the opposite end of said lever M is provided with a sleeve M′ which surrounds the shaft G′, the disk G being provided with a lug $M^2$ which engages and depresses the lever M whenever it is moved laterally into the path of said lug.

The means herein shown for moving the lever M laterally into the path of movement of the lug $M^2$ consists of a lever N pivotally connected to the block holder, as shown in Fig. 5. When the lever N is moved inwardly or toward the center of the machine the lever M will be carried into the path of movement of the lug $M^2$ on the disk G so that said lug can move the lever M downwardly in the slot $L^3$ in the block holder and thus force the block $L^2$ from said holder, the lever M being returned to normal position by means of a spring O′ connected at one end to said lever and at its opposite end to a curved arm O connected to the frame of the truck.

The operation of the baling press is as follows: As the shaft C′ rotates an oscillatory movement will be imparted to the disk G by means of the pitman F′ and a reciprocating movement will be imparted to the plunger H′ by means of the rod H which is pivotally connected to the disk. It will be noted that the pivotal points of the pitman F′ and plunger rod H are so arranged that a short movement of the crank arm F of shaft C′ will produce considerable movement of the pivotal point connecting the disk G and pitman F′ and thus impart a rapid movement to the plunger H′ at the beginning of its stroke. As the plunger advances into the baling chamber, the pitman F′ and plunger rod H approach the lines of their dead centers and the movement of the plunger becomes slower as the resistance to compression of the material being operated on increases. The reciprocating and oscillating movement of the pitman K causes the pronged member or rake $K^5$ to engage a batch of material lying on the platform B′ and feed it to the hopper $B^2$ at each cycle of operations of the machine, and as the plunger H′ moves out of the baling chamber the feeder arm J engages the material in the hopper and forces it down into the baling chamber. When a sufficient amount of material has been compressed to form a bale the operator moves the lever N laterally so as to carry the block operating lever M into the path of movement of the lug $M^2$ on the disk G, and as said lug engages the lever M said lever will be moved downwardly in the slot $L^3$ in the block holder and thus force said block out of the holder. A baling press of this description overcomes the necessity of employing manual labor to feed the material to the feeder arm which forces it into the baling chamber so that the press can be operated at a low cost. Its capacity is much greater than any baling press that has heretofore been in use because the member $K^5$ feeds the material to the feeder arm more quickly than was possible with manual labor. And still another advantage of my press is that the member $K^5$ feeds a charge or batch of material to the feeder arm at each cycle of operations so that the completed bale is composed of a number of sections which can be separated easily when the material is to be used, each section consisting of a charge or batch of material that the member $K^5$ has fed to the feeder arm. The means whereby the divisional-block is forced into the baling chamber before the feeder arm enters said chamber is a very novel feature of my invention as the entrance of the divisional-block prior to the entrance of the feeder arm eliminates the possibility of the divisional-block being forced down onto material in the baling chamber.

Having thus described my invention, what I claim as new and desire to secure by Letters Patent is:

1. A baling press comprising a disk, means for alternately giving a partial rotation to the disk in opposite directions, a plunger, a plunger rod pivoted to the plunger and to the disk, a feeder arm pivotally connected to the said disk, a spring connected to said disk and to the feeder arm, a block holder, a lever adapted to bear upon the block held in the block holder, a lug formed on the disk adapted to engage said lever, and means for throwing the lever into the path of said lug; substantially as described.

2. A baling press comprising a plunger, a disk, a plunger rod pivotally connected to the plunger and to the disk, a feeder arm pivotally connected to the disk, means for automatically bringing material to be baled into position to be operated upon by the feeder arm, a divisional block holder, means for discharging the block from the holder, means carried by the said disk for operating the block discharging means, and means for alternately giving a partial rotation to the disk in opposite directions; substantially as described.

3. A baling press comprising means for compressing material, a hopper located adjacent said compressing means, means for feeding material from said hopper to said compressing means, a platform located some distance from the hopper onto which the material is deposited, and means for delivering the material from said platform to the hopper so that it can be acted upon by said feeding means; substantially as described.

4. A baling press provided with compressing means, a platform onto which the material to be baled is thrown, a feeding member, a support on which said feeding member is pivotally mounted, means for reciprocating said support and rocking said feeding member so as to cause said member to engage the material on the platform and feed it toward the compressing means, and means independent of said feeding member for forcing the material into the path of movement of the compressing means; substantially as described.

5. A baling press provided with compressing means, a platform on which the material to be baled is thrown, a rock arm, a member pivotally connected to said arm, a feeding device carried by said member for moving the material from said platform towards the compressing means, means for reciprocating said member, and means independent of said feeding device for forcing the material into position to be operated on by said compressing means; substantially as described.

6. In a baling press, a feeding apparatus consisting of a pronged member, a pitman or rod in which said pronged member is pivotally mounted, a rock arm connected to said pitman intermediate its ends, a rotating part to which said pitman is eccentrically connected, and a connection between said pronged member and rock arm; substantially as described.

7. In a baling press, a feeding apparatus comprising a rock arm, a pitman pivotally connected intermediate its ends to said rock arm, a shaft journaled in one end of said pitman and provided with a crank arm and a feeding member, a connection between said rock arm and crank arm, and a rotating member to which said pitman is eccentrically connected; substantially as described.

8. A baling press provided with compressing means, a feeder arm for delivering material to said compressing means, an oscillating member to which said feeder arm is pivotally connected, and a spring interposed between said member and feeder arm to permit said arm to yield in case it comes in contact with a solid or hard object; substantially as described.

9. A baling press provided with a baling chamber, a stationary holder arranged above said chamber for receiving a divisional block, a yielding support forming the bottom of said holder and adapted to support the divisional block, a member adapted to engage a block in said holder and move it downwardly to discharge it therefrom, means for actuating said member, and means for moving said member into position to be engaged by said actuating means; substantially as described.

10. In a baling press, a stationary divisional-block holder, a yielding support on which the block is adapted to rest, means for discharging a block from said holder, a movable member adapted to engage said block-discharging means, and means under control of the operator for causing said member to engage said block-discharging means; substantially as described.

11. A baling press comprising an oscillating member, a reciprocating compressing member operated by said oscillating member, a feeder arm actuated by said oscillating member for delivering material to said compressing member, a divisional-block holder, a device for discharging a block from said holder, and means on said oscillating member for operating said device; substantially as described.

12. A baling press comprising an oscillating member, a reciprocating compressing member operated by said oscillating member, a feeder arm actuated by said oscillating member for delivering material to said compressing member, a divisional-block holder, a device for discharging a block from said holder, means on said oscillating member for operating said device, a platform or support onto which the material to be baled is thrown, a pronged member for moving material from said platform into position to be operated on by said feeder arm, and means independent of the oscillating member for actuating said pronged feeding member; substantially as described.

13. An automatic feeding apparatus for a baling press, comprising a rocking member, a rod or pitman pivotally connected to said member and provided with a movable device for engaging the material to be baled, means for reciprocating and oscillating said pitman, and means for moving said device relatively to said pitman; substantially as described.

14. A baling press provided with a stationary divisional-block holder having a yielding support on which the divisional-block rests, a member adapted to engage the block and discharge it from said holder, and means for operating said member; substantially as described.

15. A baling press provided with a baling chamber, a compressing member adapted to enter said chamber, a stationary divisional-block holder arranged above said baling chamber, a feeder arm for forcing material down into said baling chamber, and means for moving a block downwardly from said holder and into the baling chamber before the feeder arm enters the baling chamber; substantially as described.

16. A baling press comprising means for compressing material, means for feeding material to said compressing means, a longitudinally movable member means mounted on said member for delivering material to said feeding means; substantially as described.

17. A baling press comprising means for compressing material, means for feeding material to said compressing means, a platform onto which the material to be baled is deposited, a member provided with a device that is adapted to engage the material on said platform, and mechanism for imparting a reciprocating and rocking movement to said member to deliver the material on said platform to said feeding means; substantially as described.

In testimony whereof, I hereunto affix my signature in the presence of two witnesses, this 17th day of March, 1908.

CHARLES E. WEHRENBERG.

Witnesses:
WELLS L. CHURCH,
WM. A. THOMPSON.

Correction in Reissue Letters Patent No. 12,865.

It is hereby certified that in Reissue Letters Patent No. 12,865, granted October 13, 1908, upon the application of Charles E. Wehrenberg, of Mound City, Illinois, for an improvement in "Baling-Presses," an error appears in the printed specification requiring correction, as follows: In line 9, page 4, after the word "member" a comma and the words *and oscillatory* should be inserted; and that the said Letters Patent should be read with this correction therein that the same may conform to the record of the case in the Patent Office.

Signed and sealed this 29th day of June, A. D., 1909.

[SEAL.]

C. C. BILLINGS,
*Acting Commissioner of Patents.*